United States Patent
Lee et al.

(10) Patent No.: US 9,048,682 B2
(45) Date of Patent: Jun. 2, 2015

(54) WIRELESS POWER MULTI-CHARGING METHOD AND POWER TRANSMITTER

(71) Applicant: Samsung Electronics Co., Ltd., Gyeonggi-do (KR)

(72) Inventors: Kyung-Woo Lee, Gyeonggi-do (KR); Joon-Il Kim, Seoul (KR); Kang-Ho Byun, Gyeonggi-do (KR)

(73) Assignee: Samsung Electronics Co., Ltd (KR)

(*) Notice: Subject to any disclaimer, the term of this patent is extended or adjusted under 35 U.S.C. 154(b) by 421 days.

(21) Appl. No.: 13/644,837

(22) Filed: Oct. 4, 2012

(65) Prior Publication Data

US 2013/0082653 A1    Apr. 4, 2013

(30) Foreign Application Priority Data

Oct. 4, 2011    (KR) .................. 10-2011-0100681

(51) Int. Cl.
*H02J 7/00* (2006.01)
*H02J 7/02* (2006.01)
*H02J 17/00* (2006.01)

(52) U.S. Cl.
CPC .............. *H02J 7/025* (2013.01); *H02J 7/0027* (2013.01); *H02J 17/00* (2013.01)

(58) Field of Classification Search
CPC .......... H02J 7/025; H02J 17/00; H02J 7/0027
USPC ......................................... 320/108
See application file for complete search history.

(56) References Cited

U.S. PATENT DOCUMENTS

| | | | |
|---|---|---|---|
| 7,925,308 B2* | 4/2011 | Greene et al. ............. | 455/572 |
| 8,120,311 B2* | 2/2012 | Baarman et al. .......... | 320/106 |
| 8,618,770 B2* | 12/2013 | Baarman .................. | 320/108 |
| 8,803,474 B2* | 8/2014 | Hillan et al. .............. | 320/108 |
| 2008/0116847 A1* | 5/2008 | Loke et al. ............... | 320/108 |

* cited by examiner

*Primary Examiner* — Jack Chiang
*Assistant Examiner* — Brandon Bowers
(74) *Attorney, Agent, or Firm* — The Farrell Law Firm, P.C.

(57) ABSTRACT

A wireless multi-charging method of a power transmitter that wirelessly transmits power includes sensing a first power receiver, increasing a transmission power required for charging the first power receiver, sensing a second power receiver, decreasing the transmission power required for suspending charging of the first power receiver, and increasing the transmission power required for simultaneously charging both the first power receiver and the second power receiver.

15 Claims, 7 Drawing Sheets

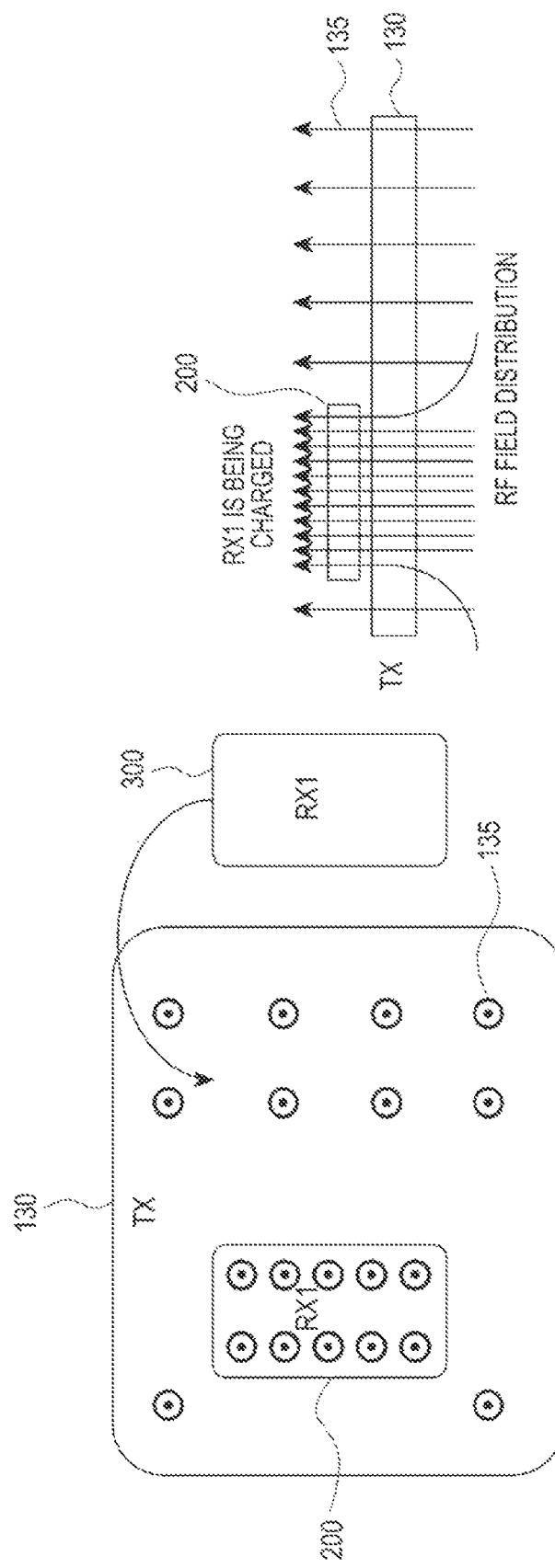

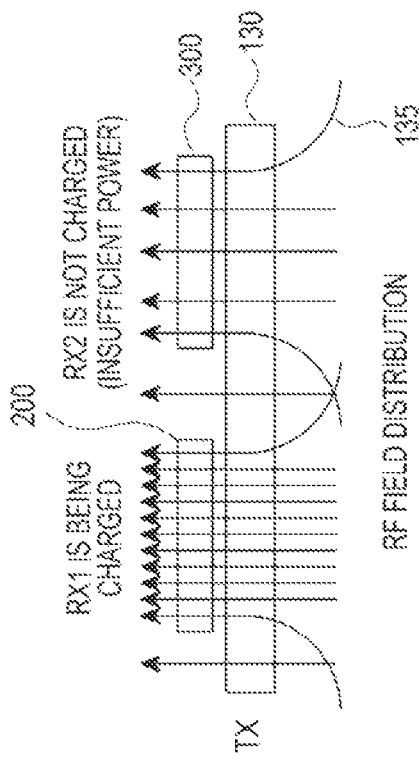
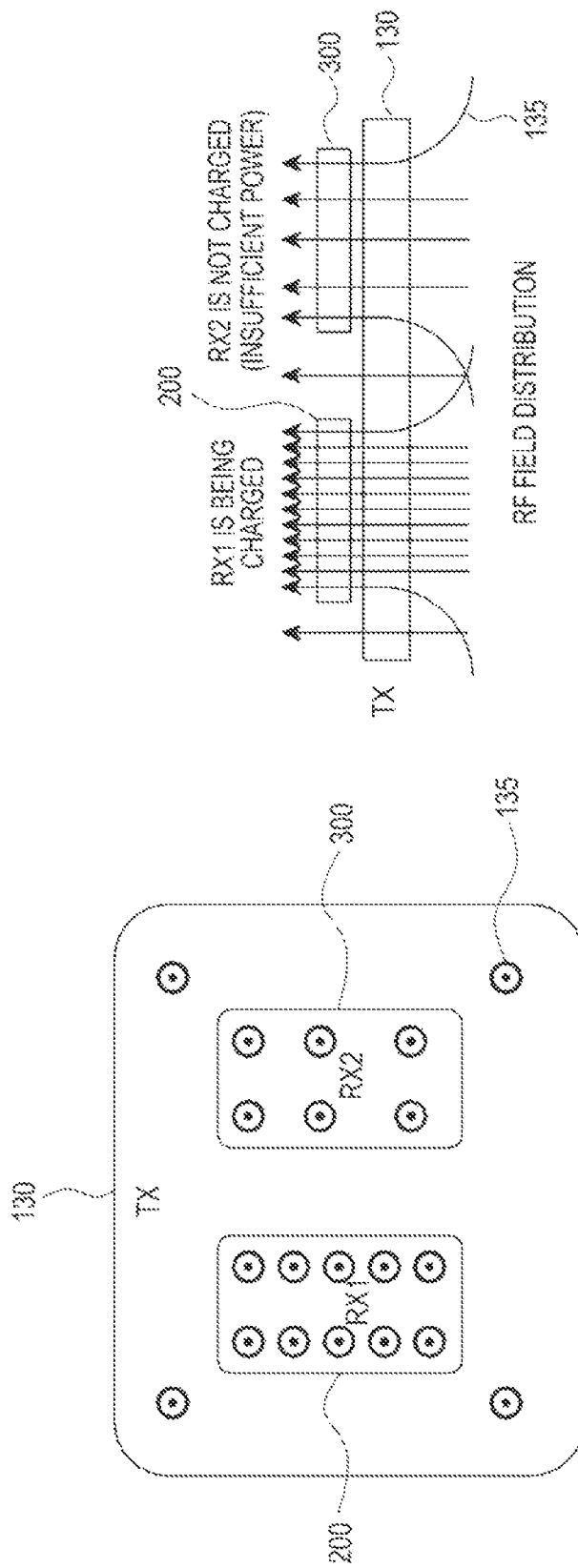
FIG.4B
FIG.4A

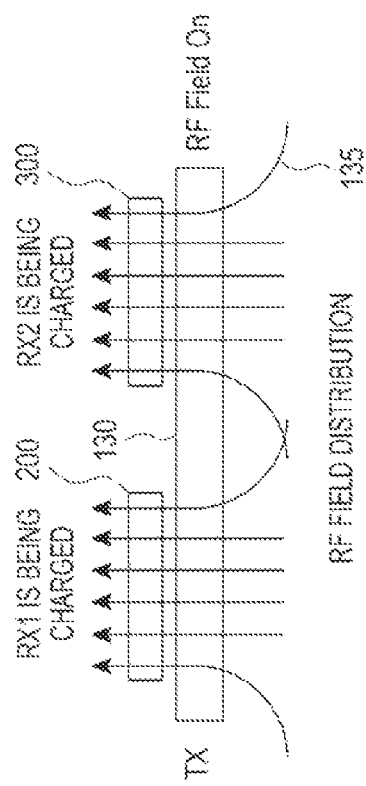
FIG. 5B
FIG. 5C
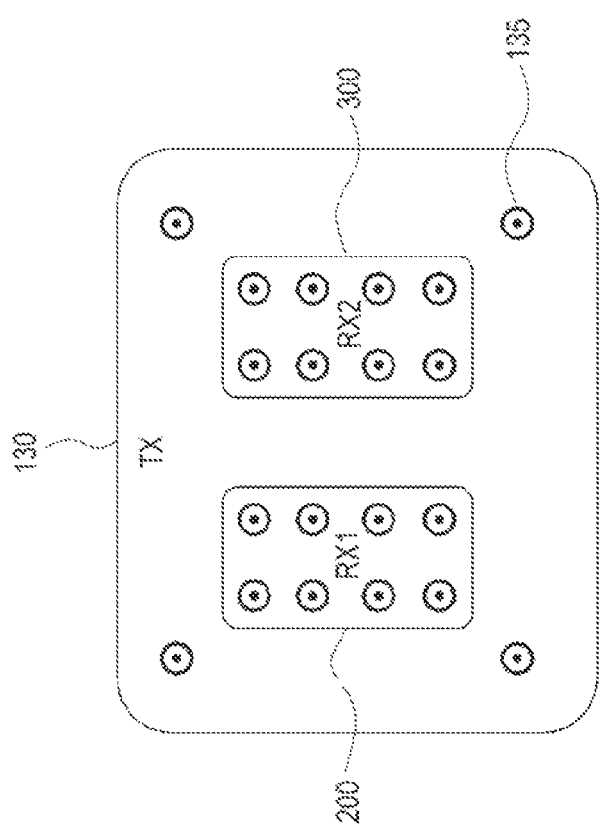
FIG. 5A

WIRELESS POWER MULTI-CHARGING METHOD AND POWER TRANSMITTER

PRIORITY

This application claims priority under 35 U.S.C. §119(a) to Korean Application Serial No. 10-2011-0100681, which was filed in the Korean Intellectual Property Office on Oct. 4, 2011, the entire content of which is incorporated herein by reference.

BACKGROUND OF THE INVENTION

1. Field of the Invention

The present invention relates generally to a wireless charging method, and more particularly, to a method and a power transmitter for wireless multi-charging.

2. Description of the Related Art

A conventional resonant type wireless charge system includes a power transmitter equipped with a first resonator and a power receiver equipped with a second resonator. When the second resonator is located in a Radio Frequency (RF) field generated by the first resonator. The second resonator absorbs the RF field and power transmission occurs.

When the second power receiver enters into a charging area of the power transmitter (that is, an effective RF field area with a transmission power greater than or equal to a predetermined threshold value) while the power transmitter performs wireless-charging of the power receiver (hereinafter referred to as the first power receiver), the first power receiver absorbs most of the RF field even though the transmission power of the power transmitter is sufficient to charge both the first power receiver and the second power receiver. Consequently, the power transmitter fails to charge the second power receiver.

SUMMARY OF THE INVENTION

Accordingly, an aspect of the present invention is to solve at least the above-described problems occurring in the prior art, and to provide at least the advantages described below.

An aspect of the present invention is to provide a method and apparatus for simultaneously and evenly charging a first power receiver and a second power receiver when charging the second power receiver is requested while the first power receiver is being charged.

Another aspect of the present invention is to provide a method and apparatus for simultaneously and evenly charging a first power receiver and a second receiver and for preventing the first power receiver from recognizing this as an interruption of charging when charging the second power receiver is requested while the first power receiver is being charged.

According to an aspect of the present invention, a wireless multi-charging method of a power transmitter that wirelessly transmits power is provided, including sensing a first power receiver, increasing a transmission power required for charging the first power receiver when sensing the first power receiver, sensing a second power receiver, decreasing the transmission power required for suspending charging of the first power receiver when sensing the second power receiver, and increasing the transmission power required for simultaneously charging both the first power receiver and the second power receiver.

According to another aspect of the present invention, a power transmitter for wireless multi-charging is provided, including a resonator configured to generate a Radio Frequency (RF) field, and to wirelessly transmit power to a first power receiver and a second power receiver through the RF field, a sensor unit configured to sense the first power receiver and the second power receiver, and a controller configured increase a transmission power to charge the first power receiver when the first power receiver is sensed, decrease the transmission power to suspend charging the first power receiver when the second power receiver is sensed, and increase the transmission power to simultaneously charge the first power receiver and the second power receiver.

BRIEF DESCRIPTION OF THE DRAWINGS

The above and other aspects, features, and advantages of the present invention will be more apparent from the following detailed description taken in conjunction with the accompanying drawings, in which:

FIGS. 3A through 5C are diagrams illustrating a charge pause step and second charge step, according to an embodiment of the present invention.

DETAILED DESCRIPTION OF EMBODIMENTS OF THE PRESENT INVENTION

Figure 1:
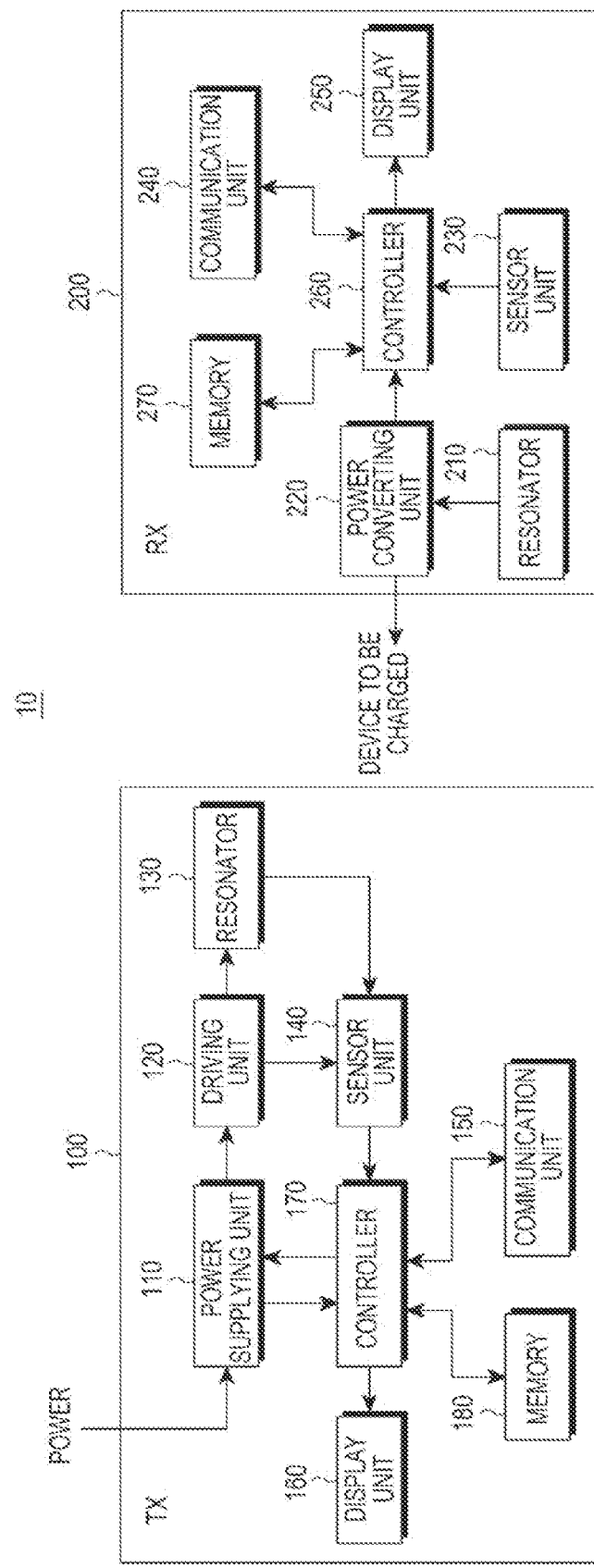
FIG. 1 is a diagram illustrating a wireless multi-charge system according to an embodiment of the present invention.

Hereinafter, various embodiments of the present invention will be described with reference to the accompanying drawings. In the following description, like elements will be designated by like reference numerals throughout the drawings. Further, definitions in the following description are provided only to aid in the general understanding of the present invention. Further, in the following description of the present invention, a detailed description of known functions and configurations is omitted to avoid obscuring the subject matter of the present invention.

Hereinafter, in the embodiments of the present invention, an ordinal number, such as first, second, or the like may be used. Such terminology is not used to indicate importance, order or sequence of a corresponding component but merely used to distinguish the corresponding component or step from other components or steps.

FIG. 1 is a diagram illustrating a wireless multi-charge system according to an embodiment of the present invention. A wireless multi-charge system 10 includes a power transmitter (TX) 100 and a power receiver (RX) 200.

The power transmitter 100 includes a power supplying unit 110, a driving unit 120, a first resonator 130, a first sensor unit 140, a first communication unit 150, a first display unit 160, a first controller 170, and a first memory 180.

The power supplying unit 110 is connected to an external power and outputs, to the first controller 170, a signal indicating a connection state (an on/off state, a provided voltage, and the like) with the external power, and supplies, to the driving unit 120, power (voltage and/or current) based on the control of the first controller 170. Alternatively, the power supplying unit 110 supplies, to the driving unit 120, power of a predetermined level.

The driving unit 120 converts or adjusts power supplied from the power supplying unit 110 based on the first controller 170 generating a driving signal for the first resonator 130, and outputting the generated driving signal to the first resonator 130. The driving signal includes a pulse or a sine wave having a predetermined cycle.

The first resonator 130 generates an RF field based on the driving signal. The first resonator 130 is provided in a planar shape, and an RF field strength on a surface of the first resonator 130 shows a generally even distribution or a loose distribution on the center of the surface and a dense distribution on the margin of the surface.

The first sensor unit 140 senses whether the power receiver 200 is located within a charging area of the first resonator 130, and outputs sensed information to the first controller 170. The first sensor unit 140 measures a signal in the driving unit 120 or the first resonator 130 (for example, a change in a waveform of a periodic pulse provided to the first resonator 130), which is changed based on a change in a load impedance value in the driving unit 120, a change in a resonant frequency value of the first resonator 130, or a change in an RF field, determines that the power receiver 200 is located in the charging area when the changed value is greater than or equal to a predetermined threshold value, and outputs a result of the determination to the first controller 170. Alternatively, the first sensor unit 140 outputs, to the first controller 170, the road impedance value, the resonant frequency value, or other signal values, or information regarding the changed value, and the first controller 170 determines that the power receiver 200 is located in the charging area when the changed value of the signal that is a target of the measurement is greater than or equal to a predetermined threshold.

The first communication unit 150 wirelessly transmits, to the power receiver 200, a Downlink (DL) data signal input from the first controller 170, and outputs, to the first controller 170, an Uplink (UL) data signal wirelessly received from the power receiver 200. Each of the UL data signal and DL data signal formats include a message, a packet, or a frame that includes a header and a payload as a basic configuration. Each data signal includes information for wireless charging. The first communication unit 150 corresponds to an out-band communication device (or module) that uses external frequencies other than a frequency for power transmission such as Zigbee, Near Field Communication (NFC), Bluetooth®, Wi-Fi, Radio Frequency Identification (RFID), or the like, or correspond to an in-band communication device that modulates a frequency used for power transmission for communication.

The first display unit 160 displays, based on the control of the first controller 170, a power supply state, a charge state, an error situation, a number of power receivers that are being charged, and the like. The first display unit 160 is implemented as a touch screen, a Liquid Crystal Display (LCD), a Light Emitting Diode (LED) array and the like.

The first controller 170 controls the driving unit 120 (and the power supplying unit 110) based on information received from the first sensor unit 140, information obtained through communication with the power receiver 200, and the like, so as to adjust a transmission power transferred to the power receiver 200 through the first resonator 130. The first controller 170 performs general functions or steps described below, by controlling other component elements in the power transmitter 100.

The first memory 180 stores a database indicating information to be transmitted to the power receiver 200 for charging, information received from the power receiver 200, and identification information regarding chargeable power receivers. The first memory 180 is implemented as a Non-Volatile Memory (NVM) such as a Solid State Disk (SSD), a flash memory card, a Read Only Memory (ROM), and the like, or a volatile memory such as a Random Access Memory (RAM) and the like.

The power receiver 200 includes a second resonator 210, a power converting unit 220, a second sensor unit 230, a second communication unit 240, a second display unit 250, a second controller 260, and a second memory 270.

The second resonator 210 generates a power signal by absorbing an RF field of the power transmitter 100. That is, the second resonator 210 receives power by absorbing the RF field because the second resonator 210 is located in the RF field created by the first resonator 130. The second resonator 210 is provided in a planar shape.

The power converting unit 220 is connected to a target device to be charged (a portable communication terminal such as a portable phone, a Personal Digital Assistant (PDA), a Portable Multimedia Player (PMP), an MP3 player, and the like), converts the power signal into a charging voltage for charging the target device, and provides the charging voltage to the target device. The power converting unit 220 outputs, to the second controller 260, a signal indicating a charge state of the target device.

The second sensor unit 230 senses whether the power receiver 200 is located in the charging area of the first resonator 130, and outputs the sensed information to the second controller 260. The second sensor unit 230 measures a change in a resonant frequency value of the second resonator 210 or a change in an output of the second resonator 210, determines that the second resonator 210 of the power receiver 200 is located in the charging area when the changed value is greater than or equal to a predetermined threshold value, and outputs a result of the determination to the second controller 260. Alternatively, the second sensor unit 230 outputs, to the second controller 260, the resonant frequency value or the output value of the second resonator 210, or information regarding the changed value, and the second controller 260 may determine that the power receiver 200 is located in the charging area when the changed value of a signal that is a target to be measured is greater than or equal to a predetermined threshold value.

The second communication unit 240 wirelessly transmits, to the power transmitter 100, a UL data signal input from the second controller 260, and outputs, to the second controller 260, a DL data signal wirelessly received from the power transmitter 100. Each data signal includes information for wireless charging. The second communication unit 240 is a communication device that is operated based on a communication scheme (including an used frequency, a protocol, and the like) of the first communication unit 150. The communication scheme of the first and the second communication units 150 and 240 is determined through bilateral discussion, notification, or selection by the first communication unit 150, or predetermined.

The second display unit 250 displays a charge state, an error situation, and the like based on the control of the second controller 260. As the second display unit 250, a touch screen, an LCD, an LED array, and the like is used.

The second controller 260 charges the target device based on information received from the second sensor unit 230, information obtained through communication with the power transmitter 100, and the like, and transmits information regarding an amount of power required for charging and the like to the power transmitter 100 through the second communication unit 240. The second controller 260 performs general functions or steps described below, by controlling other component elements included in the power receiver 200.

The second memory 270 stores information to be transmitted to the power transmitter 100 for charging, information received from the power transmitter 100, and the like. The second memory 270 is a non-volatile memory, a volatile memory, and the like.

The power receiver 200 is referred to as a first power receiver (RX1) in the following description.

Figure 2:
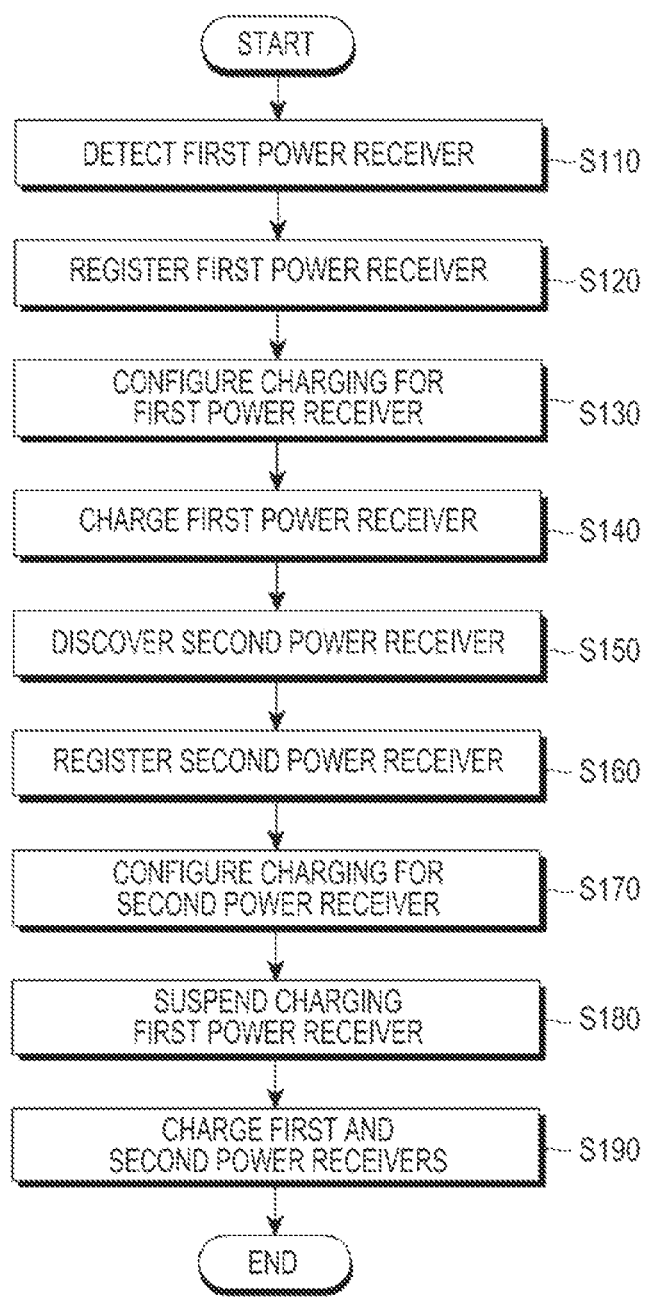
FIG. 2 is a flowchart illustrating a wireless multi-charging method according to an embodiment of the present invention.

FIG. 2 is a flowchart illustrating a wireless multi-charging method according to an embodiment of the present invention. FIGS. 3A through 5C are diagrams illustrating a charge pause step and second charge step. A second power receiver 300 has the same configuration as the first power receiver 200 of FIG. 1.

The method includes a detection Step S110, a first registration Step S120, a first configuration Step S130, a first charge Step S140, a discovery Step S150, a second registration Step S160, a second configuration Step S170, a charge pause Step S180, and a second charge Step S190.

In the detection Step S110, the power transmitter 100 periodically supplies a pulse having a low power to the first resonator 130, monitors a load on the first resonator 130, and senses that an object to be charged (that is, the first power receiver 200) enters into a charging area of the power transmitter 100 when a change in the load occurs. When the first power receiver 200 is sensed, the power transmitter 100 increases a transmission power to a predetermined first power level, supplying to the first power receiver 200, an amount of power that is sufficient for communication. Although it is described that the power transmitter 100 increases the transmission power to the predetermined first power level (that is, a communication power level) after the first power receiver 200 is sensed, so as to avoid unnecessary power consumption, alternatively the power transmitter 100 transmits power at the first power level from the monitoring step. Alternatively, a large amount of power may not be required for communication and a communication power may not need to be provided depending on the purpose of use and thus, the power transmitter 100 may not provide power for communication.

In the first registration Step S120, the first power receiver 200 requests, from the power transmitter 100, registration for charging, and the power transmitter 100 analyzes first identification information received from the first power receiver 200, and allows the registration of the first power receiver 200 when a result of the analysis satisfies predetermined criteria. For example, the predetermined criteria include information regarding a manufacturer, a product, a security, and the like, or the registration is allowed only when the manufacturer is identical.

In the first configuration Step S130, the first power receiver 200 provides, to the power transmitter 100, configuration information regarding an amount of power required for charging and the like, and the power transmitter 100 analyzes the received configuration information and allows charging the first power receiver 200 when a result of the analysis satisfies predetermined criteria. For example, the power transmitter 100 may allow charging the first power receiver 200 when the amount of power required for charging is less than or equal to an amount of available power. The amount of available power is set in advance and stored in the first memory 180 or calculated by the first controller 170.

In the first charge Step S140, the power transmitter 100 increases a transmission power to a predetermined second power level, supplying to the first power receiver 200, an amount of power that is sufficient for charging. During the first charge Step S140, the power transmitter 100 and the first power receiver 200 exchange information required for charging.

In the discovery Step S150, the power transmitter 100 detects the second power receiver 300 that enters into the charging area while the first power receiver 200 is being charged. That is, the power transmitter 100 monitors a load on the first resonator 130 even after the detection Step S110, and senses that the second power receiver 300 enters into the charging area when a change in the load occurs. When the second power receiver 300 is sensed, the power transmitter 100 increases a transmission power to a predetermined third power level, supplying to the second power receiver 300, an amount of power that is sufficient for communication, and simultaneously, to maintain charging the first power receiver 200. The discovery Step S150 is selectively omitted. Although it is described that the power transmitter 100 increases the transmission power to the predetermined third power level (that is, a communication and charging power level) after the second power receiver 300 is sensed so as to avoid unnecessary power consumption, alternatively the power transmitter 100 transmits power at the third power level from the first charge Step S140.

In the second registration Step S160, the second power receiver 300 requests, from the power transmitter 100, registration for charging, and the power transmitter 100 analyzes second identification information received from the second power receiver 300, and allows the registration of the second power receiver 300 when a result of the analysis satisfies predetermined criteria.

In the second configuration Step S170, the second power receiver 300 provides, to the power transmitter 100, configuration information regarding an amount of power required for charging and the like, and the power transmitter 100 analyzes the received configuration information and allows charging the second power receiver 300 when a result of the analysis satisfies predetermined criteria.

In the charge pause Step S180, the power transmitter 100 increases a transmission power to a predetermined fourth power level during a predetermined period of time, so as to suspend charging the first power receiver 200, and simultaneously, to provide, to the first and second power receivers 200 and 300, an amount of power that is sufficient for communication. Unlike this example, the power transmitter 100 shuts off transmission power during a predetermined period of time.

In the second charge Step S190, after the predetermined time, the power transmitter 100 increases the transmission power to a predetermined fifth power level to provide, to the first and second power receivers 200 and 300, an amount of power that is sufficient for charging. During the second charge Step S190, each of the first and second power receivers 200 and 300 and the power transmitter 100 exchange information required for charging. The fifth power level is greater than or equal to a sum of a power level required by the first power receiver 200 and a power level required by the second power receiver 300. The relationship between the first through fifth power levels (P1 through P5) is P1<P2<P4<P3<P5.

FIGS. 3A through 5C are diagrams illustrating the charge pause Step S180 and the second charge Step S190.

FIGS. 3A and 3B illustrate a case in which the first power receiver 200 is mounted (or proximally positioned) on a surface of the first resonator 130 of the power transmitter 100, and is charged. FIG. 3A is a planar view of the first resonator 130 and the first power receiver 200, and FIG. 3B is a side view of the first resonator 130 and the first power receiver 200. Before the first power receiver 200 is mounted, a distribution of an RF field on the surface of the first resonator 130 is maintained to be an initial state (a generally even distribution or loose distribution in the center and a dense distribution in the margin). When the first power receiver 200 is mounted and is charged, the first power receiver 200 absorbs the RF field and power transmission is performed. The first power receiver 200 absorbs most of the RF field generated by the first resonator 130 and thus, the RF field distribution on the first resonator 130 is concentrated on the first power receiver 200 side. That is, a space density of an RF field in an area occupied by the first power receiver 200 in the entire charging area is excessively increased and thus, a space density of an RF field in a remaining area is excessively decreased.

FIGS. 4A and 4B illustrate a case in which the second power receiver 300 is mounted (or proximally positioned) on a surface of the first resonator 130 while the first power receiver 200 is being charged. FIG. 4A is planar view of the first resonator 130 and the first and second power receivers 200 and 300, and FIG. 4B is a side view of the first resonator 130 and the first and second power receivers 200 and 300. As described above, the first power receiver 200 absorbs most of an RF field generated by the first resonator 130 and thus, a distribution of the RF field on the first resonator 130 is concentrated on the first power receiver 200 side. Accordingly, a space density of an RF field in an area occupied by the second power receiver 300 is excessively decreased. Therefore, although a transmission power of the power transmitter 100 is sufficient to charge the first and second power receivers 200 and 300, a strength (or an amount) of an RF field that the second power receiver 300 absorbs is insufficient for charging and the second power receiver 300 is not charged.

FIGS. 5A through 5C illustrate a case in which charging the first power receiver 200 is suspended and the first and the second power receivers 200 and 300 are simultaneously charged after a predetermined time when the second power receiver 300 is mounted (or proximally positioned) on a surface of the first resonator 130 while the first power receiver 200 is being charged. FIG. 5A is a planar view of the first resonator 130 and the first and second power receivers 200 and 300, and FIGS. 5B and 5C are side views of the first resonator 130 and the first and second receivers 200 and 300. As described in FIG. 4, in a state where the first power receiver 200 absorbs most of the RF field generated by the first resonator 130, when the second power receiver 300 is mounted on the first resonator 130, the second power receiver 300 is not charged. As illustrated in FIG. 5B, the power receiver 100 shuts off a transmission power during a predetermined time. Therefore, an RF field is not output from the first resonator 130. Desirably, the power transmitter 100 may decrease a transmission power to the predetermined fourth power level to suspend charging the first power receiver 200, and simultaneously, to provide, to the first and second power receivers 200 and 300, only an amount of power that is sufficient for communication. As described in FIG. 5C, after the predetermined time, the power transmitter 100 increases the transmission power to the predetermined fifth power level to provide both the first and second power receivers 200 and 300 with an amount of power that is sufficient for charging.

As described above, the power transmitter 100 may not immediately increase the transmission power and may decrease the transmission power for a while when the second power receiver 300 is mounted, so as to decrease an amount of power transferred to the first power receiver 200 and to reset the distribution of the RF field. Although power is supplied to the second communication unit 240 and the second controller 260 of each power receiver 200 and 300, an amount of the power supplied to a target device is insufficient for charging. Accordingly, the power converting unit 220 of each power receiver 200 and 300 maintains a charge Integrated Circuit (IC) in the target device to recognize that charging is maintained. For example, the power converting unit 220 may maintain a state in which little current flows although a voltage applied to the charge IC is 5V (a charging voltage).

Figure 6:
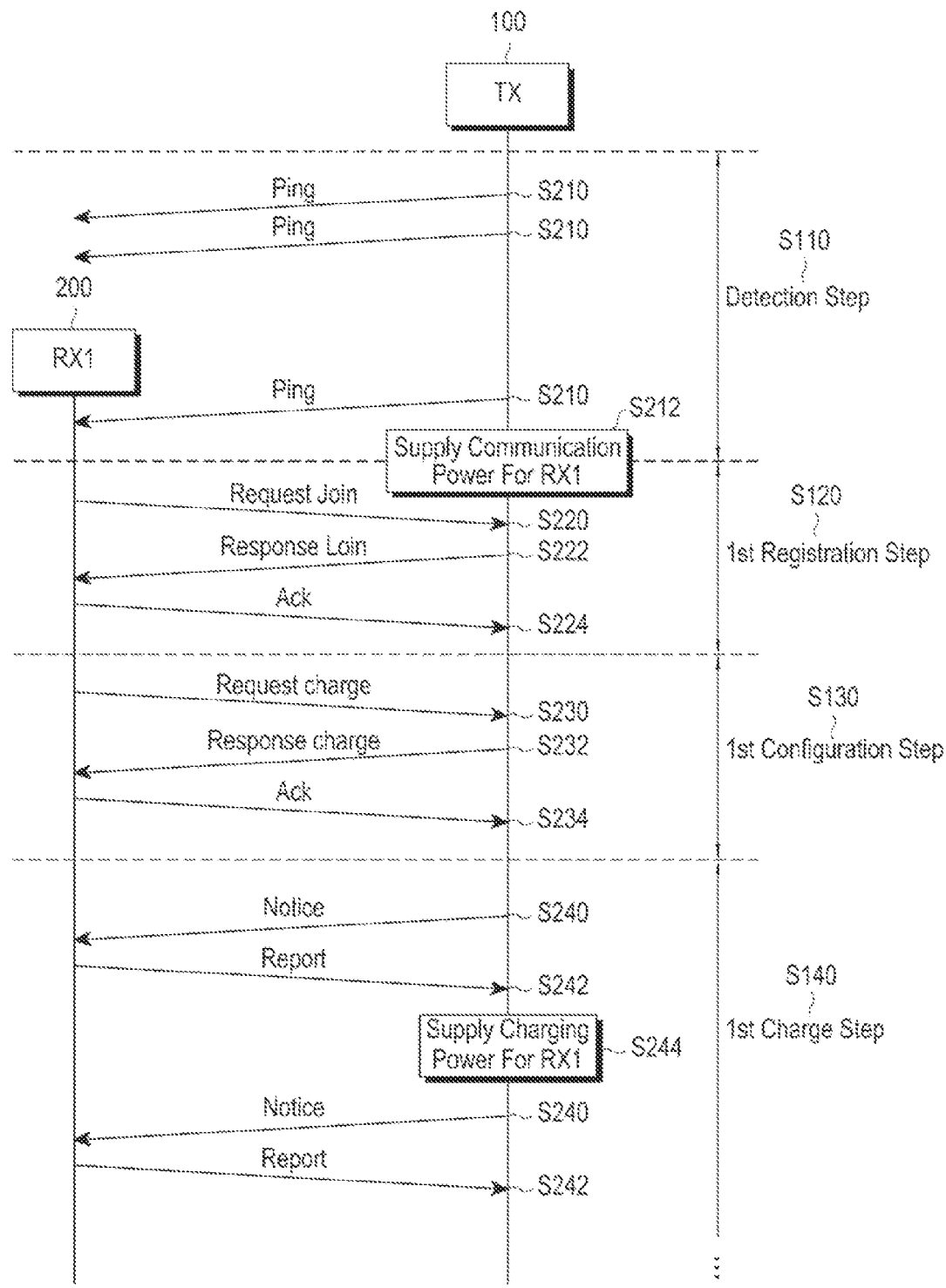
FIGS. 6 and 7 are signal flow diagrams illustrating a wireless multi-charging method according to an embodiment of the present invention.
Figure 7:
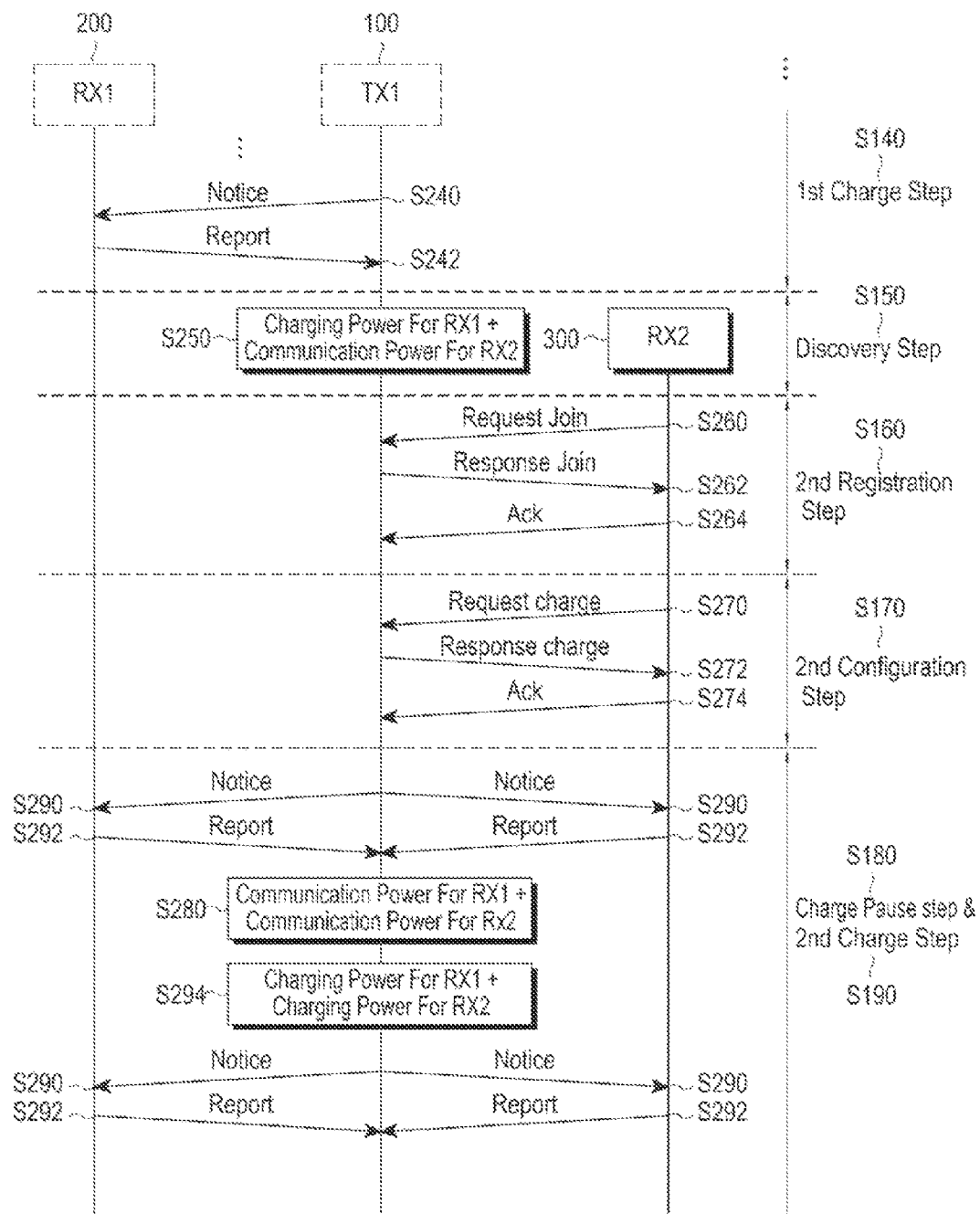

FIGS. 6 and 7 are signal flow diagrams illustrating a wireless multi-charging method according to an embodiment of the present invention. FIGS. 6 and 7 illustrate detailed steps of each step in FIG. 2.

In the detection Step S110, the power transmitter 100 periodically supplies a pulse having a low power to the first resonator 130, and monitors a load on the first resonator 130 and thus, monitors whether the first power receiver 200 is mounted in Step S210. In the monitoring step, a signal periodically output from the power transmitter 100 is referred to as a ping signal. When the first power receiver 200 is sensed, the power transmitter 100 increases a transmission power to a predetermined first power level supplying to the first power receiver 200, an amount of power that is sufficient for communication (or an amount of power for controlling the first power receiver 200) in Step S212.

In the first registration Step S120, the first power receiver 200 transmits, to the power transmitter 100, a registration request message (Request Join Message) including first identification information such as a manufacturer, a serial number and/or a security code, and the like, for registration in the power transmitter 100 in Step S220. When the Request Join Message is received, the power transmitter 100 compares the first identification information and identification information stored in advance, and determines that charging the first power receiver 200 is allowed when the first identification information and the identification information are identical to one another, allocates a communication ID to the first power receiver 200, and transmits, to the first power receiver 200, a registration response message (Response Join Message) including the communication ID in Step S222. When the Response Join Message is received, the first power receiver 200 transmits, to the power transmitter 100, an acknowledgement message (ACK Message) that acknowledges normal reception in Step S224. A database indicating identification information regarding chargeable power receivers is stored in the first controller 170 or in a memory included in the first controller 170, or in the first memory 180 separately included in the power transmitter 100.

In the first configuration Step S130, the first power receiver 200 transmits, to the power transmitter 100, a charging request message (Request Charge Message) including configuration information for charging, such as a grade of power required for charging and/or an amount of power required for charging in Step S230. When the Request Charge Message is received, the power transmitter 100 analyzes the received configuration information and allows charging the first power receiver 200 when a result of the analysis satisfies predetermined criteria. For example, when the amount of power required for charging is less than or equal to an amount of available power, the power transmitter 100 allows charging the first power receiver 200 and transmits, to the first power receiver 200, a charging response message (Response Charge Message) indicating whether the request for charging is allowed or rejected in Step S232. When the Response Charge Message is received, the first power receiver 200 transmits, to the power transmitter 100, an ACK Message that acknowledges normal reception in Step S234.

In the first charge Step S140, the power transmitter 100 increases the transmission power to a predetermined second power level supplying to the first power receiver 200, an amount of power that is sufficient for charging in Step S244. The power transmitter 100 may transmit, to the first power receiver 200, a notice message (Notice Message) including charge state information such as sync information, charge start information, reset information, charge finish information and/or an error situation, and the like, periodically or every time an event occurs in Step S240. The first power receiver 200 transmits, to the power transmitter 100, a report message (Report Message) including charge state information such as an amount of power required for charging (voltage and current), an amount of power (voltage and current) received from the power transmitter 100, a charge state, an error situation, and the like, periodically or every time an event occurs in Step S242.

In the discovery Step S150, when the power transmitter 100 detects the second power receiver 300 while the first power receiver 200 is being charged, the power transmitter 100 increases the transmission power to a predetermined third power level supplying to the second power receiver 300, an amount of power that is sufficient for communication, and simultaneously, to maintain charging the first power receiver 200 in Step S250.

In the second registration Step S160, the second power receiver 300 transmits, to the transmitter 100, a Request Join Message including second identification information, such as a manufacturer, a serial number and/or a security code, and the like, for registration in the power transmitter 100 in Step S260. When the Request Join Message is received, the power transmitter 100 compares the second identification information and identification information stored in advance, determines that charging the second power receiver 300 is allowed when the second identification information and the identification information are identical to one another, allocates a communication ID to the second power receiver 300, and transmits a Response Join Message including the communication ID to the second power receiver 300 in Step S262. When the Response Join Message is received, the second power receiver 300 may transmit, to the power transmitter 100, an ACK Message that acknowledges normal reception in Step S264.

In the second configuration Step S170, the second power receiver 300 transmits, to the power transmitter 100, a Request Charge Message including configuration information for charging, such as a grade of power required for charging and/or an amount of power required for charging, and the like in Step S270. When the Request Charge Message is received, the power transmitter 100 analyzes the received configuration information, allows charging the second power receiver 300 when a result of the analysis satisfies predetermined criteria, and transmits, to the second power receiver 300, a Response Charge Message indicating whether the request for charging is allowed or rejected in Step S272. When the Response Charge Message is received, the second power receiver 300 transmits, to the power transmitter 100, an ACK Message that acknowledges normal reception in Step S274.

In charge pause Step S180 and the second charge Step S190, the power transmitter 100 decreases the transmission power to a predetermined fourth power level during a predetermined period of time, so as to suspend charging the first power receiver 200, and simultaneously, to supply, to the first and second power receivers 200 and 300, an amount of power that is sufficient for communication in Step S280. After the predetermined period of time, the power transmitter 100 increases the transmission power to a predetermined fifth power level supplying to the first and second power receivers 200 and 300, an amount of power that is sufficient for charging in Step S294. The power transmitter 100 transmits, to the first power receiver 200 and/or the second power receiver 300, a Notice Message including charge state information such as sync information, charge start information, reset information, charge finish information and/or an error situation, and the like, periodically or every time an event occurs in Step S290. The first and second power receivers 200 and 300 transmit, to the power transmitter 100, a Report Message including charge state information such as an amount of power (voltage and current) required, an amount of power (voltage and current) received from the power transmitter 100, a charge state, an error situation, and the like, periodically or every time an event occurs in Step S292. For example, the power transmitter 100 may transmit, to the first power receiver 200 (and the second power receiver 300), a Notice Message indicating a reset state before decreasing the transmission power, and may transmit, to the first and the second power receivers 200 and 300, a Notice Message indicating a charge start, immediately before or after increasing the transmission power after the predetermined period of time.

According to embodiments of the present invention, when a second power receiver or a third power receiver is mounted on a power transmitter while a first power receiver is being charged, an RF field that the first power receiver absorbs is canceled so that the second or third power receiver may begin charging, and simultaneously, the first receiver is continuously charged without interruption.

That is, according to embodiments of the present invention, an RF field is decreased during a short period of time when multi-charging is started so that the RF field is reset and the RF field is distributed again and the multi-charging may smoothly begin.

Additionally, according to an embodiment of the present invention, when a second power receiver and a third power receiver are mounted on a power transmitter while the power transmitter charges a first power receiver, an RF field is canceled so that charging begins smoothly and interruption of charging the first power receiver is prevented from being displayed on a User Interface (UI).

It will be apparent to those of ordinary skill in the art that embodiments of the present invention can be implemented in the form of hardware, software or a combination of hardware and software. Software is stored in a volatile or non-volatile storage device such as Read Only Memory (ROM) and the like irrespective of erasing or rewriting, a memory such as a Random Access Memory (RAM), a memory chip, a device, and a integrated circuit, or a storage medium that is capable of performing optical or magnetic recording and machine-reading such as Compact Disc (CD), Digital Versatile Disc (DVD), optical disc, magnetic tape, and the like. A memory that is included in a power transmitter or a power receiver includes machine-readable storage media that are suitable for storing a program including instructions to implement the embodiments, or programs. Therefore, the embodiments of the present invention include a program including a code to implement an apparatus or a method and a machine-readable storage medium including the program, for example, a computer-readable storage medium. The program is transferred electronically through a medium such as a communication signal transferred through a wired or wireless connection, and the invention may appropriately include an equivalent medium.

It will be apparent to those of ordinary skill in the art that, the power transmitter or the power receiver, according to an embodiment of the present invention, receives a program from a program providing device that is a wiredly or wirelessly connected, and stores the program. The program providing device includes a program including instructions to instruct the power transmitter or the power receiver to perform a predetermined wireless multi-charging method, a memory storing information required for the wireless multi-charging method and the like, a communication unit to perform wired or wireless communication with the power transmitter or the power receiver, and a controller to transmit the program to the power transmitter or the power receiver, automatically or in response to the request from the power transmitter or the power receiver.

While the present invention has been shown and described with reference to various embodiments thereof, it will be understood by those skilled in the art that various changes in form and detail may be made without departing from the spirit and scope of the present invention as defined by the appended claims.

What is claimed is:

1. A wireless multi-charging method of a power transmitter that wirelessly transmits power, the method comprising:
   sensing a first power receiver;
   increasing a transmission power required for charging the first power receiver when sensing the first power receiver;
   sensing a second power receiver;
   decreasing the transmission power required for suspending charging of the first power receiver when sensing the second power receiver; and
   increasing the transmission power required for simultaneously charging both the first power receiver and the second power receiver.

2. The method of claim 1, further comprising:
   supplying, to the first power receiver, a communication power required for communication with the first power receiver.

3. The method of claim 1, further comprising:
   receiving a registration request message from the first power receiver; and
   transmitting, to the first power receiver, a registration response message including identification information of the first power receiver, in response to the registration request message.

4. The method of claim 3, further comprising:
   comparing identification information received through the registration request message and identification information stored in advance; and
   allowing registration of the first power receiver when the received identification information is identical to the identification information stored in advance.

5. The method of claim 1, further comprising:
   receiving, from the first power receiver, a charging request message including information regarding an amount of power required for charging; and
   transmitting, to the first power receiver, a charging response message that allows the request for charging, in response to the charging request message.

6. The method of claim 5, further comprising:
   comparing the amount of power required for charging and an amount of available power; and
   allowing the request for charging when the amount of power required for charging is less than or equal to the amount of available power.

7. The method of claim 1, further comprising:
   transmitting, to the first power receiver, a notice message including first charge state information of the power transmitter; and
   receiving, from the first power receiver, a report message including second charge state information of the first power receiver.

8. The method of claim 7, wherein the first charge state information includes sync information, charge start information, reset information, charge finish information, or an error situation, and the second charge state information includes an amount of power required for charging, an amount of power received from the power transmitter, a charge state, or an error situation.

9. The method of claim 1, further comprising:
   supplying, to the second power receiver, a communication power required for communication with the second receiver when the second power receiver is sensed.

10. The method of claim 1, wherein, when the transmission power is decreased, a communication power required for communication with the first power receiver and the second power receiver is supplied to the first power receiver and the second power receiver.

11. A power transmitter for wireless multi-charging, the power transmitter comprising:
    a resonator configured to generate a Radio Frequency (RF) field, and to wirelessly transmit power to a first power receiver and a second power receiver through the RF field;
    a sensor unit configured to sense the first power receiver and the second power receiver; and
    a controller configured to increase a transmission power to charge the first power receiver when the first power receiver is sensed, decrease the transmission power to suspend charging the first power receiver when the second power receiver is sensed, and increase the transmission power to simultaneously charge the first power receiver and the second power receiver.

12. The power transmitter of claim 11, further comprising:
    a communication unit configured to perform wireless communication with the first power receiver and the second power receiver,
    wherein the controller is further configured to receive a registration request message from the first power receiver, and transmit, to the first power receiver, a registration response message including identification information of the first power receiver, in response to the registration request message.

13. The power transmitter of claim 12, further comprising:
    a memory configured to store identification information regarding chargeable power receivers,
    wherein the controller is further configured to compare identification information received through the registration request message and identification information stored in the memory, and allow registration of the first power receiver when the received identification information is identical to identification information stored in advance.

14. The power transmitter of claim 11, wherein the controller is further configured to receive, from the first power receiver, a charging request message including information regarding an amount of power required for charging, compare the amount of power required for charging and an amount of available power, and transmit, to the first power receiver, a charging response message that allows the request for charging, in response to the charging request message, when the amount of power required for charging is less than or equal to the amount of available power.

15. The power transmitter of claim 11, wherein the controller is further configured to supply, to the first power receiver and the second power receiver, a communication power required for communication with the first power receiver and the second power receiver when the transmission power is decreased.

\* \* \* \* \*